Jan. 8, 1952 — J. N. MATTHEWS — 2,581,427
LIQUID LEVEL GAUGE FOR BALLAST TANKS
Filed May 24, 1947 — 3 Sheets-Sheet 1
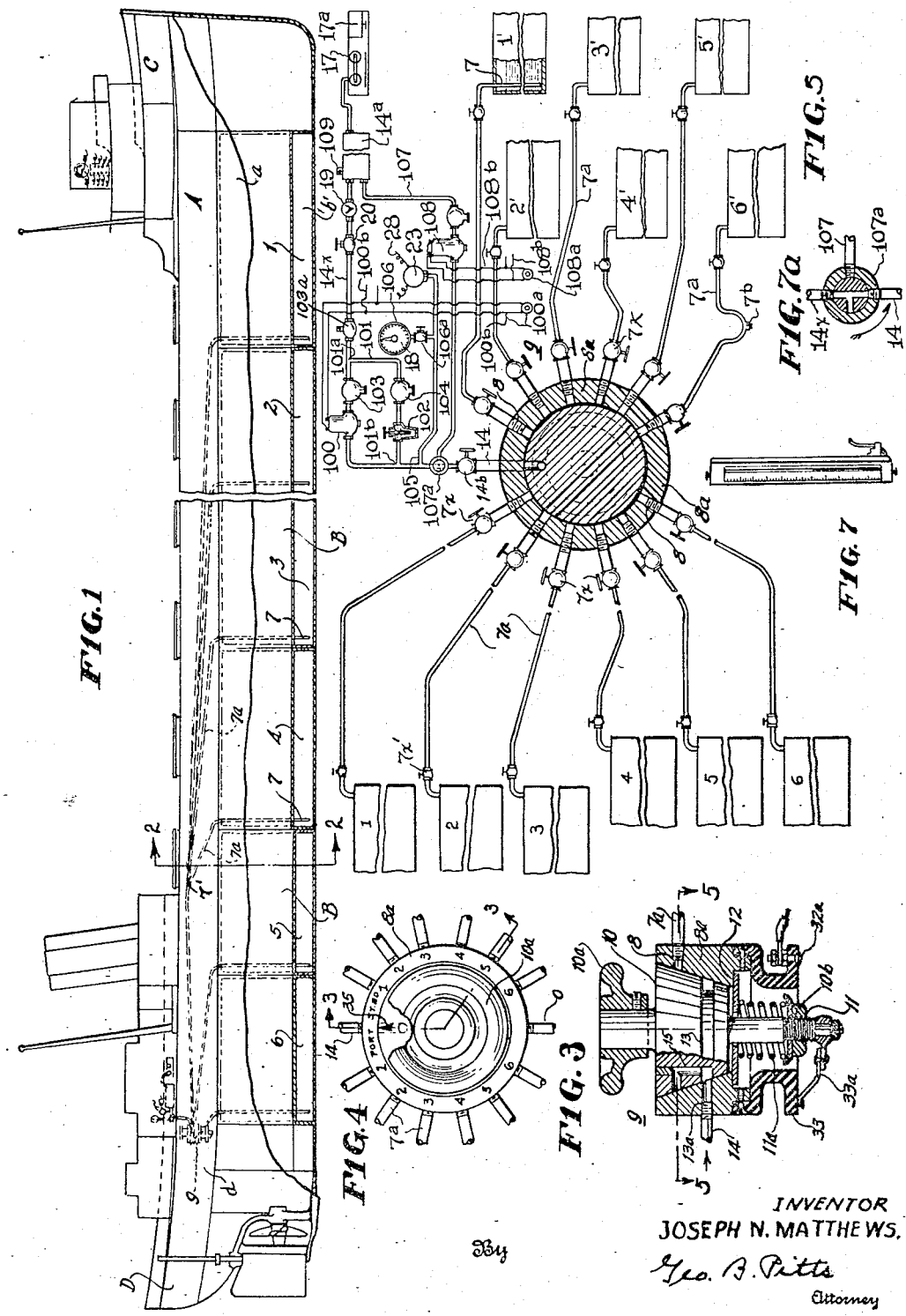
INVENTOR
JOSEPH N. MATTHEWS.
By Geo. B. Pitts
Attorney Jan. 8, 1952        J. N. MATTHEWS        2,581,427
LIQUID LEVEL GAUGE FOR BALLAST TANKS
Filed May 24, 1947        3 Sheets-Sheet 2
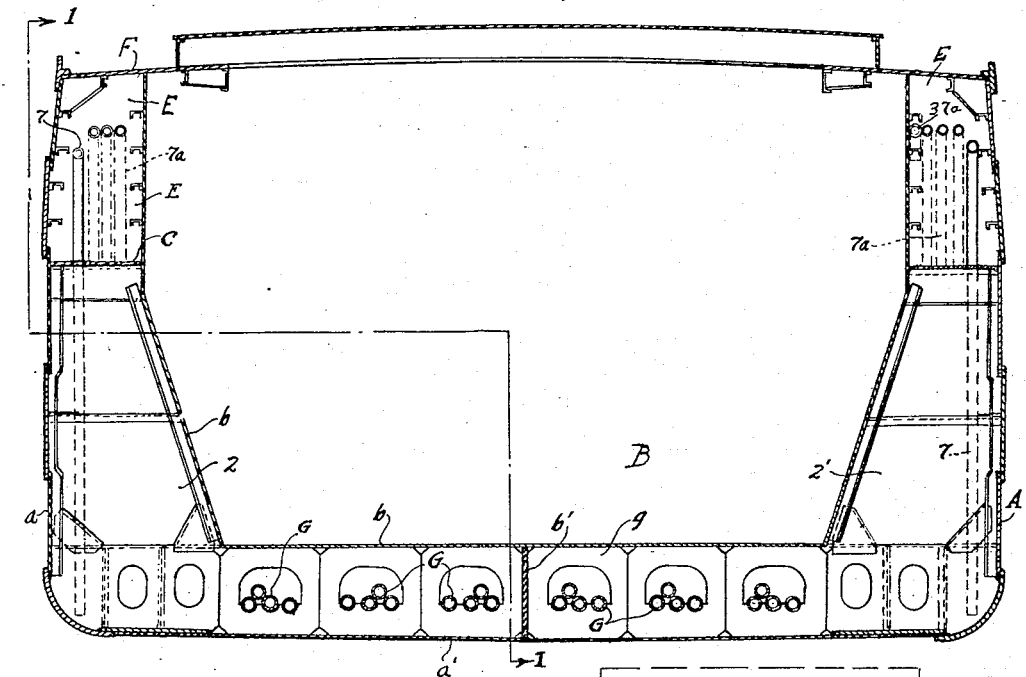
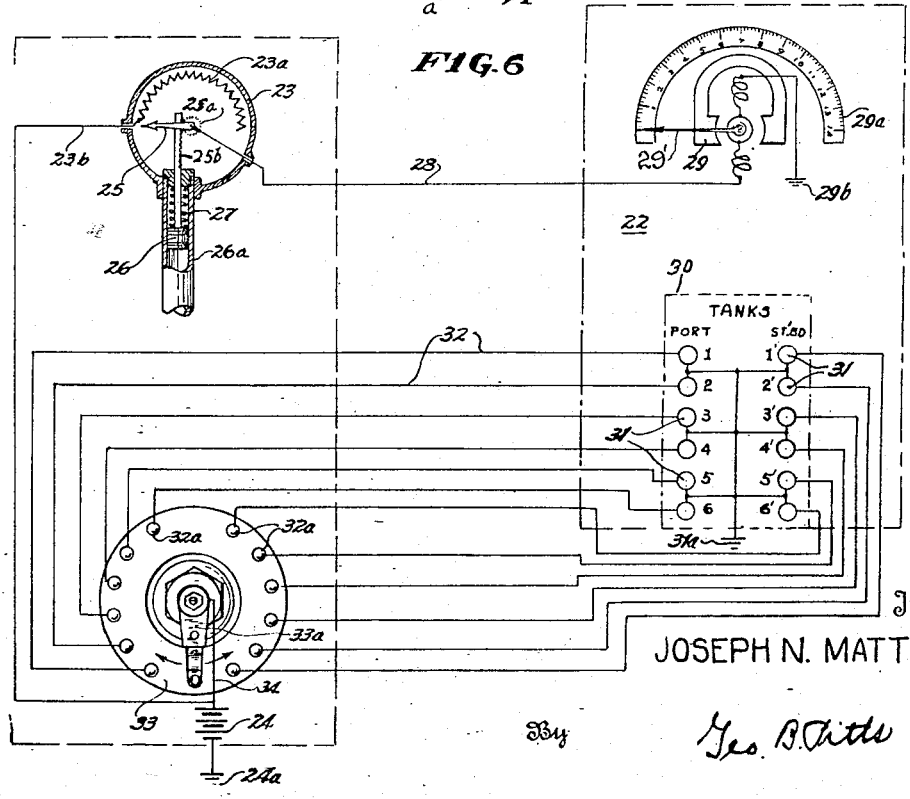
Inventor
JOSEPH N. MATTHEWS
By Geo. B. Title
Attorney Jan. 8, 1952  J. N. MATTHEWS  2,581,427
LIQUID LEVEL GAUGE FOR BALLAST TANKS
Filed May 24, 1947  3 Sheets-Sheet 3
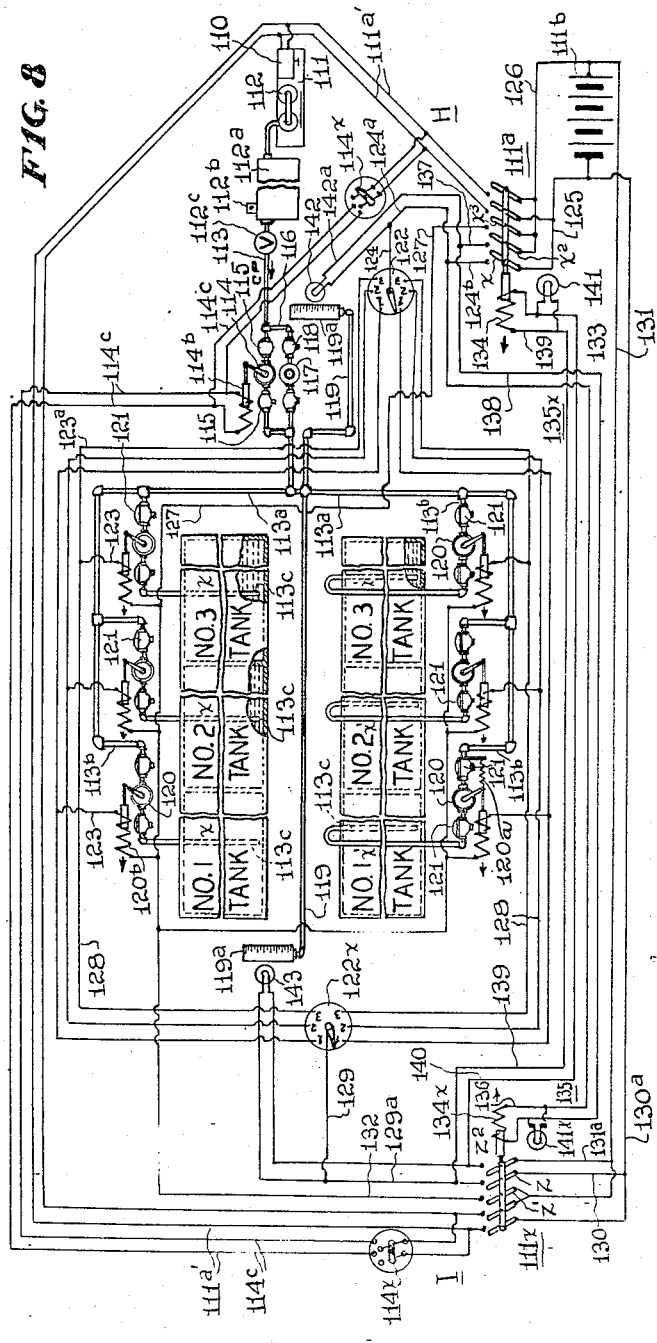
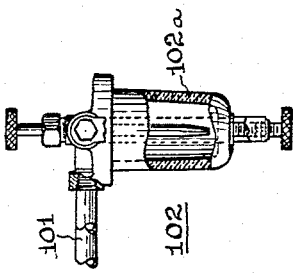
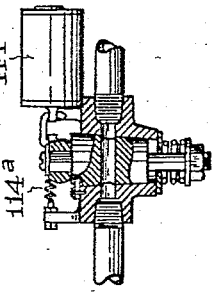
INVENTOR.
JOSEPH N. MATTHEWS
BY
Geo. B. Pitts
ATTORNEY.

Patented Jan. 8, 1952

2,581,427

UNITED STATES PATENT OFFICE 2,581,427

LIQUID LEVEL GAUGE FOR BALLAST TANKS

Joseph N. Matthews, Lakewood, Ohio

Application May 24, 1947, Serial No. 750,328

2 Claims. (Cl. 73—302)

This invention relates to a ship or boat, more particularly apparatus incorporated therein for determining the ballast therein, whereby the boat draft may be changed or regulated dependent on external conditions, the boat load or location of the latter, that is, where (a) the ship is being propelled without a load, fully loaded or partially loaded and/or (b) the ship's load is not properly distributed and/or (c) the body of water, through which the ship is being propelled, is calm or in varying degrees of roughness. Likewise, the ship must be trimmed to avoid engagement with equipment on wharves or piers when tying thereto or being shifted therealong. To insure efficient propulsion under these conditions it is necessary to ascertain the depth of the water in each tank or certain of the tanks, so as to determine which tanks should be supplied with additional water, the volume therein or other tanks reduced, or all of the water in the tanks withdrawn therefrom. Other conditions arise where it is highly important to quickly determine the depth of water in the tanks—certain tanks or all thereof; for example, when all or substantially all of the water is to be withdrawn, in which event the pumps must be slowed down in time to prevent the latter from pumping air, instead of water, from the tanks. Each ship, when designed has a certain cargo carrying capacity and a certain capacity for ballast, the latter to be increased or decreased as conditions require by supplying water to one or more of the ballast tanks or discharging water therefrom. Once the ballast tanks are filled, the required ballast regulation and-or draft of the ship to meet the operating conditions above referred to at any time can be determined by measuring the hydrostatic head in one or more of the tanks. My invention has been applied to a ship or boat of the ore carrying type. On ships of this type, so far as my knowledge goes, it is customary for a seaman to stand on the ship's deck and project a rod into the water in each tank (or in one or more tanks according to his orders) to measure the depth of the water therein by the water line on the rod. Aside from the fact that these operations involve an undue amount of labor and time, it is often a dangerous physical operation, due to the weather or sea conditions, and during a precipitation the rod may get wet from the rain and hence prevent a correct reading of the water line on the rod. These disadvantages in measuring the depth of water in the ship's tanks are more apparent where the ship or boat is large in size, some of which are approximately 600 feet along and contain as many as 18 tanks (9 tanks at each side of the ship holds). My invention eliminates the disadvantages above referred to on the one hand and on the other hand provides for readily taking static-head readings in each of the tanks or any selected tanks, as desired, at one or more stations, in a short period of time, whereby the trim of the ship may be quickly regulated or changed.

One object of the invention is to provide in a ship or boat equipped with water holding tanks, improved means for selectively measuring the depth of water in the tanks as a means of determining whether water is to be supplied to or discharged from one or more of the tanks to regulate the ship's draft dependent upon or to meet various operation conditions.

Another object of the invention is to provide in a ship or boat equipped with water holding ballast tanks, improved means for determining at one or more stations the depth of water in each tank in a simplified manner and in a relatively short period of time.

Another object of the invention is to provide in a ship or boat equipped with water holding ballast tanks, improved water depth determining means employing a single gage at an operating station, whereby minimum space at the station is utilized and cost of installation is materially reduced.

Another object of the invention consists in certain improvements in the apparatus disclosed in my co-pending application Ser. No. 641,899, filed January 18, 1946, now Patent Number 2,518,484, to insure greater accuracy in measuring the water depths in the boat tanks, and wherein installation is materially simplified and labor costs are reduced.

Other objects of the invention will be apparent to those skilled in the art to which my invention relates from the following description taken in connection with the accompanying drawings, wherein Fig. 1 is a view, partly in side elevation and partly in section on the line 1—1 of Fig. 2, of a boat equipped with apparatus embodying my invention.

Fig. 2 is a section on the line 2—2 of Fig. 1, enlarged.

Fig. 3 is a longitudinal section through the valve, substantially on the line 3—3 of Fig. 4.

Fig. 4 is a plan view of the valve.

Fig. 5 is a diagrammatic view, the valve being in section on the line 5—5 of Fig. 3.

Fig. 6 is a diagrammatic view showing the system for indicating the depth of the water in the respective tanks at a remote location.

Fig. 7 illustrates a modified form of gage.

Fig. 7a is a fragmentary section through the valve for the by-pass pipe.

Fig. 7b is a fragmentary side elevation of the check valve for the by-pass, parts being broken away.

Fig. 8 is a diagrammatic view showing a modified form.

Fig. 9 is a fragmentary side view (parts being broken away) of one of the valves shown in Fig. 8.

Fig. 9a is a plan view of the valve shown in Fig. 9, parts being broken away.

In the drawings, A indicates as an entirety a boat of the ore carrying type, which is chosen to exemplify the application of my invention, constructed to provide (a) holds B between the bow and super-structure (pilot house and officers' quarters) C and the stern D containing the engine room d and (b) tanks along the port and starboard sides of the boat, outwardly of the holds B, the tanks on the port side being designated 1, 2, 3, 4, 5 and 6 and those on the starboard side being designated 1', 2', 3', 4', 5' and 6'. It will be understood that the number of tanks on each side of the boat A will depend on its length and other factors. Each tank is provided for by the outer side wall a of the hull, the side and bottom walls b of the adjacent hold B, the bottom wall a' of the hull, a partition b' disposed centrally of the hull between the bottom wall b and bottom wall a', and a top wall c, which provides a space E between it and the deck F, for a purpose later set forth. Each wall c is formed with a suitable vent leading into the space E to permit escape and intake of air due to filling and emptying of the adjacent tank and discharge of air supplied to the tank in ascertaining the depth of water therein as hereinafter described. G indicates pipes extending through and supported on the reinforcing plates g between the bottom walls a' and b, these pipes being connected to one or more pumps (not shown) the operation of which serves to supply water therethrough to the tanks and draw water therefrom in maintaining or changing the draft of the boat. In the application of the invention above referred to the top walls of the tanks would be approximately 23½ feet above the hull bottom wall a' and provide a water depth, when the tanks are filled to the maximum level, of approximately 22 feet, so as to leave a space above the water level therein.

7 indicates a pipe depending vertically into each tank and terminating a short distance (preferably approximately three inches) above the bottom wall a'. The lower or free end of each pipe 7 is open, so that the water in the adjacent tank rises and falls in the pipe corresponding to the level in the tank incident to the supply of water to the tank or withdrawal of water therefrom. The upper end of each pipe 7 is connected to one end of a pipe 7a preferably leading through the adjacent space E and connected at its opposite end to a port 8 formed in the casing 8a of a master valve 9, which is located at an operating station, such as the engine room d. As will be understood from Fig. 5, the valve casing 8a is formed with a plurality of ports 8, corresponding to the number of tanks, each pipe 7a being connected to one of these ports. By preference, as shown in Fig. 1, intermediate portions of the pipes 7a (except the pipes related to tanks 6 and 6') between the tanks and valve 9 are extended upwardly, as shown at 7', to permit gravitation of condensation of moisture in the pipes. In this arrangement condensation in one portion of each pipe 7a drains back into the adjacent pipe 7 and condensation in the other portion drains into a collector 7b, preferably consisting of a U-section (one only being shown) interposed in the pipe 7a in close relation to and at a level below the valve 9. The bottom portion of the U-section 7b is provided with a discharge opening which is sealed closed by a screw plug.

The inner wall of the valve causing 8a is of conical shape to form a seat for the valve element 10 having at one side a device (preferably a wheel) 10a for turning it and at its opposite end a shank 10b. The outer end portion of the shank 10b is provided with screw threads to take a nut 11. The nut 11 serves as an abutment for the outer end of a spring 11a coiled around the shank 10b; the inner end of the spring 11a engages an annular plate 12 seated on the valve casing 8a. In this arrangement the spring 11a cooperates with the nut 11 and plate 12 to yieldably maintain the valve element 10 in its seat in the casing 8a. The side wall of the valve element 10 is formed with an annular recess 13 which registers with the inner end of an inlet port 13a formed in the valve casing 8a. The outer end of the port 13a is connected to a conduit 14, to which a fluid in the gaseous phase (preferably air) under pressure is supplied from a reservoir 14a, as later set forth. At one side of the recess 13, the valve element is formed with a duct 15 having a vertical portion connected with the recess 13 and an outwardly extending portion arranged to register with each of the ports 8, whereby by rotation of the valve element 10, air under pressure is supplied from the conduit 14 to each of the ports 8 according to the angular position of the valve element. As the valve element 10 is provided with only one duct 15, all of the ports 8 are closed when the valve element is in neutral position (see Fig. 5) and when the valve element is rotated to connect the duct 15 with any one of the ports 8 all of the remaining ports are closed. The air under pressure may be supplied to the reservoir 14a from any suitable source; that is, a compressor on board the boat and forming part of its equipment and connected to the reservoir 14a or from a suitable pump 17 connected to the reservoir and driven by a suitable motor 17a (the pump and motor being shown diagrammatically). The air in the reservoir 14a is preferably maintained at approximately 25 pounds pressure. Adjacent the valve 9 each pipe 7a is provided with a cut-off 7x, each thereof being adapted to be closed when repairs are needed.

The air connections between the reservoir 14a and the pipe 14 on the inlet side of the valve 14b consist of the following: 14x indicates a pipe leading from the reservoir 14a to the pipe 14 and provided adjacent the reservoir with an adjustable constant pressure valve 19. Outwardly of the valve 19 is an adjustable valve 20 for regulating the flow of air through the pipe 14x. 100 indicates a cut-off in the pipe 14x preferably of the solenoid operated type. The cut-off 100 is normally closed under spring pressure, but operable by a suitable push button 100a for closing a circuit 100b therefor, whereby, upon closing of the circuit, the coil of the solenoid is energized to open the valve 100. 101 indicates a by-pass connected to the pipe 14x at opposite sides of the valve 100, as shown at 101a, 101b. 102 indicates an adjustable check valve, preferably comprising a sight feed device (commonly referred to as a sight feed bubbler) and consisting of a support having a depending transparent receptacle 102a (see Fig. 7b) containing a body of water and air inlet and outlet connections interposed in the by-pass 101, the inlet being connected to a downwardly extending pipe the lower end of which leads into the water below its level and provided with an adjustable needle valve, whereby the flow of air through the device may be regulated. The needle valve of the device 102 is adjusted to permit a slight, substantially zero flow of air to the pipe 14x to maintain the latter filled therewith. 103, 103a, indicate strainers preferably provided in the pipe 14x inwardly of the valve 100 and at opposite sides of the adjacent connection 101a of the by-pass 101 therewith and 104 indicates a strainer in the by-pass 101 between the sight feed device 102 and the connection 101a of the by-pass 101 with the pipe 14x. Each strainer serves to sift out any dirt or solid particles existing in the air; and each is provided with a removable plug to permit cleaning of the strainer. 105 indicates a pipe connected to the pipe 14x between the valve 14b and the connection 101b of the by-pass 101 with the pipe 14x. 106 indicates a suitable gage connected to the pipe 105 for registering the water depth in each selected tank in the manner later set forth, the air pipe connection between the pipe 105 and the gage being provided with a valve 106a, which may be of the relief type to avoid damage to the gage 106. It is to be noted that flow of air under pressure through the system sets up a certain amount of friction, which increases with the length of the pipe and varies according to the depth of the water in the tanks and this frictional reaction affects the operation of the gage so that the latter does not give an accurate reading. To insure proper and quick operation of the gage, I provide the by-pass 101 with the air supply device 102 therein, to maintain air in the pipe 14x outwardly of the cut-off 100 and in the pipe 105, so that when the cut-off 100 is operated to admit air under pressure, friction which would otherwise result from a constant flow of the air and affect the operation of the gage is eliminated.

107 indicates an auxiliary by-pass between the reservoir 14a and pipe 14x, outwardly of the pipe 105, the connection of the by-pass 107 with the pipe 14x consisting of a three-way rotary valve 107a, which in normal position connects the pipe 14x with the pipe 14, as shown in Fig. 7a. 108 indicates a cut-off in the auxiliary by-pass 107 preferably of the solenoid operated type. The cut-off 108 is normally closed under spring pressure, but is operable by a suitable push button 108a for closing a circuit 108b therefor, whereby, upon closing of the circuit, the coil of the solenoid is energized to open the cut-off 108. The auxiliary by-pass 107 is employed to supply air under pressure through pipe 14 and the pipes 7a and 7 for each tank, so as to remove moisture, condensation therein and water which may have been forced into the latter pipes from the ballast tanks due to heavy weather conditions. Such removal may be found desirable when readings of the water depths are to be made, but more particularly in the fall and winter before the boat is put out of service for the winter, so that the pipes and connections will be dry and danger of freezing eliminated. As will be observed, when moisture and/or water in the pipes 7a, 7, are to be removed, the valve 107a is operated to close pipe 14x and connect the by-pass 107 with the pipe 14 and the valve 9 is operated to connect the pipe 14 with each of the pipes 7a and when each connection is made the cut-off 108 is operated as above set forth. 109 indicates a suitable safety valve mounted on the top wall of the reservoir 14a.

Current for the circuits 100b and 108b may be supplied from a suitable battery (not shown) or the battery hereinafter referred to.

As will be understood, the pipe 7 in each ballast tank provides a column of water substantially equal in depth to that in the adjacent tank at all times (except as hereinafter set forth), so that by displacing the water in the pipe by the application thereto of air under pressure, the pressure, which is required for such displacement, as indicated on the gage, will equal the static-head of the volume of water in the pipe and this pressure in turn, in connection with the computations later referred to, is utilized to indicate the depth of the water in the tank. Accordingly, by rotation of the valve element 10 to effect communication between the reservoir 14a and the pipe 7 in each tank or any selected tank, the depth of the water therein may be determined. The gage 106 may be graduated to indicate the volume of water in each tank, the hydrostatic-head of the water or its depth. By preference, the gage 106 is graduated to indicate the depth of the water in the pipe measured in feet and inches.

The gage 106 shown in Fig. 5 is of the graduated dial type, but other forms of gages may be employed, such as a manometer shown in Fig. 7.

*Operation.*—As already set forth, cut-offs 100 and 108 are closed, valve 107a is in normal position connecting the pipe 14x with the inlet pipe 14 and cutting of by-pass 107, valve 14b is open and valve 9 is in normal position (see Fig. 5) closing all ports 8 for the pipes 7a. When the depth of water in any selected tank is to be determined, the valve 9 is operated to connect the latter with the pipe 7a leading to the selected tank; next, the push button 100a is operated to open valve 100 which supplies air under pressure from the constant pressure valve 19 to pipe 14, valve 9, pipe 7a and pipe 7 of the selected tank, the effect of which is to displace the water in the pipe 7, the pressure required for such displacement being indicated on the gage 106, which being graduated in feet and inches, exhibits the depth of the water in the selected tank. The depth of the water in any number or all of the tanks may be determined, dependent on the conditions present. It will be observed that the pipes 14x, 14 and conduits or ducts in the valve 9 are maintained filled with air due to flow thereof through by-pass 101, so that in making a subsequent reading on the gage 106 of the depth of water in each tank it is only necessary to maintain the valve 100 open for a short period of time, namely, approximately two seconds, to build up pressure outwardly of the valve 100 in the pipe 14x, pipe 7a and pipe 7 of the selected tank, the result being that each reading is quickly made. In this period of time the hand of the gage 106 swings about its axis and comes to a stop due to displacement of all of the water in the pipe of the selected tank. If a more accurate determination of the water depths in the tanks is required the lineal dimension between the bottom of the tanks and lower ends of the pipes must be added to the indications shown by the gage of the hand or the latter pre-adjusted relative to its zero position.

As will be apparent, these readings will enable the commanding officer to order water to be supplied to or withdrawn from the tank or tanks of which a depth reading was made.

It will be observed that when a depth reading of each tank is made and the valve 9 is operated to neutral position or to another operating position, the pipe 7a and adjacent pipe 7 remain charged with air, so that in operating the valve 9 to make a subsequent reading of the water depth in each tank the time required for the supplied air under pressure to flow to the adjacent pipe 7 and displace the water therein and friction are eliminated. It will thus be seen that the valve 9 may be readily rotated from one operating position to another operating position and all of the pipe readings quickly made. If prior to a subsequent reading of a tank water has been supplied thereto, the static-head resulting from such supply will cause a rise of the water in the adjacent pipe 7 and compression of the air therein; and upon making the subsequent reading the supplied air pressure, in addition to the pressure in the pipe previously utilized to displace the water therein, will be indicated on the gage by movement of the gage arm to a higher point or graduation. If prior to a subsequent depth reading of a pipe a portion of the water in the adjacent tank has been withdrawn therefrom, the reduced static-head in the tank will permit escape of air from the adjacent pipe 7 to equalize its pressure and the then existing static-head, but upon making the subsequent reading the applied air pressure corresponding to the static-head of the water in the pipe will be indicated by the gage 106.

7x' indicates a supplemental cut-off provided in each pipe 7a in close relation to the adjacent tank, whereby air flow to the latter may be cut off when the tank is to be inspected or its walls repaired.

Means, indicated as an entirety at 22, are provided for simultaneously indicating at a control station (for example—the pilot house), remote from the operating station, the reading for each tank each time a depth reading is made. The means 22 herein shown is of the electrical type and consists of the following: 23 indicates a casing mounted on the wall of the engine room. The casing encloses an arc shaped resistance 23a one end of which is connected to a lead 23b, the lead in turn being connected to the positive side of a suitable battery 24, having its negative side grounded at 24a. The walls of the casing 23 support a shaft carrying an arm 25 arranged to engage the resistance 23a and movable from end to end thereof. The shaft for the arm 25 has fixed to it a gear 25a engaged by a ratchet 25b, the lower end of which is provided with a piston 26 reciprocatable in a cylinder 26a. As shown in Fig. 5, the cylinder 26a is connected to the conduit 105, so that when the valve 9 is operated to measure the depth of the water in each of the pipes 7 the pressure operates the gage 106 and simultaneously forces the piston 26 upwardly, whereby the arm 25 is revolved relative to the resistance 23a. A spring 27 is interposed between the end wall of the cylinder 26a and piston 26 and normally operates to bias the latter downwardly to swing the arm 25 to zero position as shown in Fig. 6. A stop may be provided to limit the movement of the arm 25, under influence of the spring 27, at the zero position. The arm 25 is connected through a lead 28 to one side of a suitable electrically operated gage 29 having a scale 29a graduated similarly to the scale for the gage 106. The opposite side of the gage 29 is grounded at 29b. The resistance 23a is constructed to control the current to the gage 29, so that in each operation of the valve 9 the arm 29b' thereof swings relative to the scale 29a a distance equal to the movement of the arm for the gage 106. 30 indicates a panel associated with the gage 29 and mounting a series of lamps 31, one lamp for each ballast tank, one side of the lamps being grounded at 31a. The other sides of the lamps 31 are connected by leads 32 (one for each lamp) to contacts 32a, respectively, mounted on an annular collar 33 (see Fig. 3) formed of insulating material and suitably fixed to the inner end of the valve casing 8a. The outer end of the shank 10b for the valve element 10 is provided with an arm 33a connected by a lead 34 with the battery 24, the arm being suitably insulated from the shank 10b. The outer end of the arm 33a is arranged to engage the contacts 32a when the valve element 10 is rotated. The arm 33a is fixed to the shank 10b in alinement with the duct 15 and the contacts 32a are alined with the ports 8, respectively, whereby operation of the wheel 10a to supply air pressure to each of the pipes 7 will insure closing of the circuit for the lamp corresponding to the tank in which each pipe is mounted. In operation, assuming that the depth of tank 4 is to be determined, the valve element 10 is turned counter-clockwise, as viewed in Fig. 4 (clockwise as viewed in Fig. 6) from neutral position until duct 15 registers with the port 8 related to pipe 7a, which is connected to the pipe 7 of ballast tank 4; in this movement of the valve element 10, the arm 33a sweeps over the contacts related to the lamps corresponding to tanks 1, 2 and 3, momentarily lighting these lamps and comes to rest on the contact related to the lamp corresponding to tank 4, which lamp remains lighted while the depth of tank 4 is determined and notifies the officer in the pilot house which tank is being tested, whereas the gage 29 exhibits in lineal dimensions the static-head in pipe 7 of the tank, whereby the depth of water in the latter can be determined as already set forth.

The operating device 10a is preferably provided with an arrow 35 in alined relation to the duct 15. The arrow 35 serves as a guide for the operative to indicate the position of the duct 15 when the device 10a is being operated.

Fig. 8 illustrates an apparatus for making depth readings at any one of a plurality of operating stations, two stations H, I, being shown for exemplification, the valves for the several ballast tanks being selectively controlled at each station by a main switch and a selector or master switch and the main switch of each station being interconnected to the main switch of the other station or stations so that when a depth reading or readings are being made at one station, the main switches of the remaining stations are automatically inoperative.

Referring to Figs. 8, 9 and 9a, 1x, 2x, 3x, indicate water holding tanks on the port side of the boat and 1x', 2x', 3x', water holding tanks on the starboard side of the boat. These respective tanks are provided for as shown in Fig. 2 and the number at each side of the boat will depend on the length thereof and other factors. 110 indicates a motor, which is mounted on a support 111 and through a main switch 111a at station H or main switch 111x at station I and leads 111a', is supplied with current from a suitable battery 111b and drives a suitable compressor 112 for supplying compressed air to a reservoir 112a having a relief valve 112b.

Each main switch 111a, 111x, consists of a plurality of terminals and moving contact carrying arms connected together and movable to engage the adjacent terminals to connect in the battery 111b for all of the circuits for the adjacent station. 113 is a discharge pipe leading from the reservoir 112a and connected at its outer end to pipes 113a each common to the tanks at one side of the boat and having branches 113b, one for each adjacent tank terminating in a pipe 113c which extends downwardly in the tank to within a predetermined distance of the bottom of the latter, preferably approximately three inches therefrom. 112c indicates an adjustable constant pressure valve in the pipe 113, preferably disposed adjacent to the reservoir 112a. 114 indicates a cut-off in the pipe 113 outwardly of the valve 112c, the cut-off being normally closed by a spring 114a (see Figs. 9 and 9a) and opened by a solenoid 114b, the coil of which is connected by leads 114c, 111a', through each main switch with the battery 111b, the circuit to the coil of the solenoid being completed subject to operation of a switch 114x when either main switch 111a, 111x, is closed.

Each of the circuits 114c, which control the operation of the solenoid 114b, is provided with a switch 114x, preferably of the push-button type, and operated in the manner later set forth. The pipe 113 is preferably provided at opposite sides of the cut-off 114 with strainers 115 to collect dirt and other foreign matter which may exist in the supplied air. 116 indicates a by-pass for air connected to the pipe 113 inwardly of the inner strainer 115 and outwardly of the outer strainer 115 and provided with an adjustable check valve, preferably a sight feed device 117 arranged to provide a minimum supply of air in the pipes 113a, 113b, and the pipe 113 outwardly of the cut-off 114 to reduce or eliminate friction incident to air flow as already set forth. The device 117 is similar in construction to the sight feed device shown in Fig. 5. 118 indicates strainers preferably disposed in the by-pass 116 at opposite sides of the sight feed device 117 to collect dust and other foreign matter existing in the air. 119 indicates auxiliary branch pipes connected to the system outwardly of the by-pass 116, for example, one of the pipes 113a, and connected at their outer ends to gages 119a associated with the stations H, I, respectively. The gages 119a are preferably of the manometer type, such as shown in Fig. 7.

120 indicates a cut-off in each branch pipe 113b, preferably similar to the cut-off shown in Figs. 9 and 9a, the cut-off being normally held closed by the adjacent spring 120a and operated to open position by the adjacent solenoid 120b, when the circuit to the coil thereof is closed. In Fig. 8, only one cut-off 120 is shown provided with a spring, so that the other cut-offs and associated parts will be more clearly shown.

121 indicates suitable strainers disposed in each branch pipe 113b at opposite sides of the adjacent cut-off 120 to collect dirt and other foreign matter existing in the air. 122, 122x, indicate selector or master switches, associated with the stations H, I, respectively. Each of the switches 122, 122x, consists of a support provided with terminals, one for each tank 1x, 2x, 3x, 1x', 2x', 3x', and a revoluble hand having a contact arranged to engage each of the adjacent terminals upon movement of the hand about its axis, so as to close the circuit through that terminal corresponding to the tank selected at any time to be tested for water depth. As will later be apparent, the operation of the master switch 122 is effective when the main switch 111a is closed and the master switch 122x is effective when the main switch 111x is closed.

For station H, the circuit for the solenoid coil for each cut-off 120 is traced as follows: one end of coil, lead 123, lead 123a, terminal of the master switch 122 corresponding to the tank to be tested, master switch hand, lead 124, lead 124a, lead 124b to main switch terminal, switch arm $x$, lead 125 to battery; battery, lead 126, main switch arm $x^3$ and lead 127 to the opposite end of solenoid coil.

For station I, the circuit for the solenoid coil for each cut-off 120 is traced as follows: one end of coil, lead 128, lead 128a, terminal of the master switch 122x corresponding to the tank to be tested, master switch hand, lead 129, lead 129a to terminal of main switch 111x, main switch arm $z$, lead 130, lead 130a to battery; battery, lead 131, main switch arm $z'$ and lead 132 to the opposite end of solenoid coil.

The main switches 111a, 111x, are normally maintained in circuit open position so that each may be operated, independently of the other, and manually operated to closed position by a suitable lever or handle (not shown).

Means, indicated as an entirety at 133, are provided to interconnect the main switches, so that when one thereof is operated to closed position, the other main switch is (a) held in an inoperative or open position, or (b) if in closed position it is automatically moved to open position, to preclude the operation of depth readings at the station adjacent to the latter switch. The inter-connecting means 133 consist of solenoids 134, 134x, associated with the main switches 111a, 111x, respectively, and circuits therefor, the current flow for each solenoid coil, in the arrangement shown, being in a direction to move its core outwardly and resist inward movement thereof. Each core of the solenoids is operatively connected to the movable arms of the adjacent main switch and controlled by the closing of the other main switch; that is, the coil of the solenoid related to one switch is energized, to control its core, upon the closing of a circuit by the closing of the other switch. For example, with both main switches 111a, 111x, open, as shown in Fig. 8, and it is desired to take tank readings at station H, main switch 111a is moved to closed position, which operation closes the circuit 135 for the coil of solenoid 134x, which coil being energized, will prevent movement of its core inwardly (toward the right as viewed in Fig. 8); if it is desired to take tank readings at station I, main switch 111x is moved to closed position, which operation closes the circuit 135x for the coil of solenoid 134, which coil being energized, will prevent movement of its core inwardly (toward the left as viewed in Fig. 8). The circuit 135 is traced as follows: from one end of coil of solenoid 134x, lead 136, lead 124b to terminal of main switch 111a, switch arm $x$, lead 125 to battery; battery, lead 126, switch arm $x^2$, lead 137 and lead 138 to the opposite end of the coil. The circuit 135x is traced as follows: from one end of coil of solenoid 134, lead 139, lead 129a to terminal of main switch 111x, switch arm $z$, lead 130, lead 130a to battery; battery, lead 131, lead 131a, switch arm $z^2$, lead 140 to opposite end of coil.

141 indicates an electric bulb parallelly connected in the circuit 135x and mounted adjacent the main switch 111a to serve as a signal to show that the main switch 111x is closed and in operation. 14x indicates an electric bulb parallelly connected in the circuit 135 and mounted adjacent the main switch 111x to serve as a signal to show that the main switch 111a is closed and in operation.

If the operative at either station is of the opinion that the main switch at the other station, through an oversight or otherwise, has been left closed, operation of his main switch will, through the solenoid at the other station, automatically open the switch for that station and thus disconnect the circuits thereat.

142 indicates an electric bulb associated with the manometer 119a at station H and supplied with current by leads 124a, 124b, lead 142a and lead 137. 143 indicates an electric bulb associated with the manometer 119a at station I and supplied with current by lead 129a and lead 140. As each bulb 142, 143, is lighted when the adjacent main switch is closed, it serves as a signal or warning to the operative when completing a test or tests to open the main switch and stop the motor 110 and de-energize the coil of the solenoid for cut-off of the tank last tested, unless the hand of the adjacent master switch has been moved to zero position.

From the foregoing description it will be apparent that the depth readings may not only be made at any one of several operating stations remote from the ballast tanks, but that the electrically operated devices and the circuits therefor are mounted outside of the tanks, so that contact of the water in the latter and chemicals and oils in the water cannot take place.

*Operation.*—As already set forth, the cut-off 114 is closed and each cut-off 120 is closed and main switches are open (but one may be in closed position) and switches 114x are open. If reading is to be taken at one station—for example, at station H—of water depth in tank 3x on the port side of boat, the hand of master switch 122 is swung clockwise into engagement with terminal 3; next, the main switch 111a is operated to close the circuit 111a', which (a) operates the motor 110 to drive the compressor 112 and build up pressure in the reservoir 112a and (b) energizes coil of solenoid 134x to make main switch 111x inoperative, and circuit for the cut-off 120 in branch pipe 113b leading to tank 3x, to open cut-off 120; next, the adjacent push button 114x is operated and held in closed position for approximately two seconds to open cut-off 114 and supply air under pressure through pipes 113, 113a, 113b, leading to tank 3x and the pipe 113c, to displace the water in the latter, the pressure to effect such displacement being indicated on the adjacent gage 119a. As these pipes are filled with air, a reading on the gage is quickly made. As the cut-off 114 is open only when push button 114x is operated, it will be observed that when one reading is made, the hand of the gage 122 may be moved into engagement with another terminal and thereafter the push button operated to effect a second reading. Accordingly, a reading of other tanks or all thereof may be made in a short period of time.

To those skilled in the art to which my invention relates many changes in construction and widely differing embodiments and applications of my invention will suggest themselves without departing from the spirit and scope thereof. The descriptions and disclosure herein are purely illustrative and are not intended to be in any sense limiting.

What I claim is:

1. In a system for determining at an operating station the liquid levels in the ballast tanks of a ship consisting of a plurality of pipes, each depending vertically into one of the tanks and terminating at a position adjacent the bottom thereof, each said pipe having an unobstructed lower open end to permit intake of liquid into said pipe and discharge of liquid therefrom, a source of supply of a gaseous medium under pressure, gaseous medium supply connections between said source of supply and said depending pipes consisting of a main conduit leading from said source of supply and branch conduits connected to and leading from said main conduit to the upper ends of said depending pipes, respectively, a pressure regulating valve in said main conduit, a gage having connection with said main conduit outwardly of said valve, and a valve mechanism in said connections outwardly of the connection of said gage with said main conduit and arranged to selectively supply the gaseous medium to each depending pipe to displace all of the liquid therein, and indicate the pressure on said gage, a separate conduit provided between said source of supply of gaseous medium and said main conduit to by-pass said regulating valve, the connection of said separate conduit to said main conduit consisting of a valve arranged to simultaneously close off the supply of said medium through said main conduit and connect said separate conduit thereto, whereby upon operation of said valve mechanism the gaseous medium may be supplied direct from said source of supply to each of said branch conduits to displace sediment and foreign matter accumulated therein.

2. In a system for determining at a selected one of a plurality of operating stations the liquid levels in the ballast tanks of a ship consisting of a source of supply of gaseous medium under pressure, a main discharge conduit leading from said source of gaseous medium supply, branch discharge pipes connected to said main discharge pipe, the terminating end portion of each branch pipe being vertically disposed in and depending into one of the tanks to a point adjacent the bottom thereof and having an unobstructed open end adapted to receive liquid supplied to the tank, a normally closed electrically operated valve in said main discharge conduit, a separate normally closed electrically operated valve in each of said branch pipes, circuits for said electrically operated valves adapted to be connected to a source of current supply, a switch mechanism at each station in the circuits for said valves in said branch pipes for selectively operating said valves to open position, a separate switch at each station in the circuit for the valve in said main discharge conduit for opening it, the opening of said valve in said main discharge conduit and the valve for any selected one of said branch conduits serving to displace all of the liquid in the adjacent depending pipe, a gage at each station in said main discharge conduit between said source of supply of gaseous medium and the valves for said branch conduits, said gage, after displacement of the liquid in the depending pipe for the selected branch conduit and upon closing of the valve in said main discharge conduit, being arranged to register the pressure in said depending pipe, an auxiliary switch at each station in the circuits for the adjacent selective switch mechanism and said separate switch, a relay at each station operatively connected to the adjacent auxiliary switch, and a circuit for each relay adapted to be controlled by the auxiliary switch at the remote station, the operation of either auxiliary switch to closed position being arranged to close the circuit for the coil of the relay connected to the other auxiliary switch to prevent closing of the latter.

JOSEPH N. MATTHEWS.

REFERENCES CITED

The following references are of record in the file of this patent:

UNITED STATES PATENTS

| Number | Name | Date |
| --- | --- | --- |
| 31,125 | Nystrom | Jan. 15, 1861 |
| 656,947 | Cowles | Aug. 28, 1900 |
| 804,570 | Wheeler | Nov. 14, 1905 |
| 1,084,325 | Ford | Jan. 13, 1914 |
| 1,100,867 | Dexter | June 23, 1914 |
| 1,172,650 | Walton | Feb. 22, 1916 |
| 1,333,580 | Staud | Mar. 9, 1920 |
| 1,900,774 | Star | Mar. 7, 1933 |
| 2,213,485 | Conley | Sept. 3, 1940 |
| 2,384,618 | Hebeler | Sept. 11, 1945 |
| 2,471,026 | Eby | May 24, 1949 |

FOREIGN PATENTS

| Number | Country | Date |
| --- | --- | --- |
| 304,717 | Germany | Apr. 3, 1918 |
| 118,729 | Austria | Aug. 11, 1930 |
| 437,706 | Great Britain | Nov. 4, 1935 |